Dec. 15, 1931.  W. W. LEINERT  1,836,978

LIQUID MEASURING MACHINE

Filed Sept. 12, 1928  2 Sheets-Sheet 1

INVENTOR.
Wenzel W. Leinert
BY
Wm. H. Caufield.
ATTORNEY

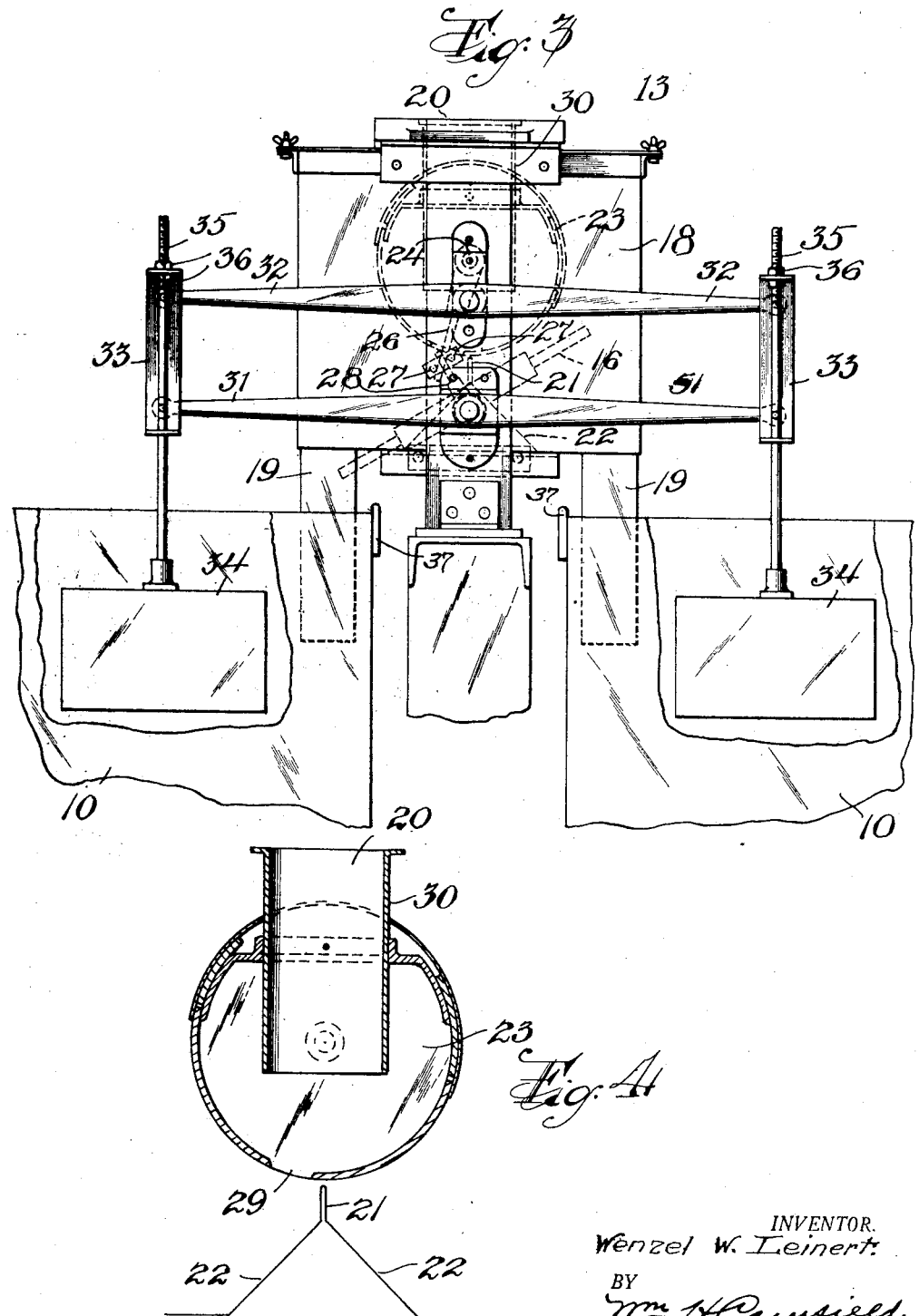

Patented Dec. 15, 1931

1,836,978

UNITED STATES PATENT OFFICE

WENZEL W. LEINERT, OF NEW YORK, N. Y.

LIQUID MEASURING MACHINE

Application filed September 12, 1928. Serial No. 305,488.

This invention relates to an improved liquid weighing machine which acts as a precision meter by filling alternate tanks which tilt when the pre-determined quantity of liquid is in each, in turn, the tilting tank then being siphoned of its contents while the other tank is being filled. This invention is an improvement over my previous patented machines such as shown and described in my patent No. 863,032, issued August 13, 1907.

The invention relates to a flow-directing means which directs liquid to the tanks alternately and is constructed so that there is an absolute certainty as to the amount of liquid in a tank when it tilts. The flow-directing means gradually shifts the stream of liquid as one tank nears filling and in consequence of this there is a greatly reduced stream of liquid flowing into the filled tank as its maximum capacity causes it to tilt. Furthermore, there is no possibility with this flow-directing means of liquid passing into a tilted tank as the tilted tank holds the flow-directing means in position to deliver its full volume to the other or level tank.

Figure 2:
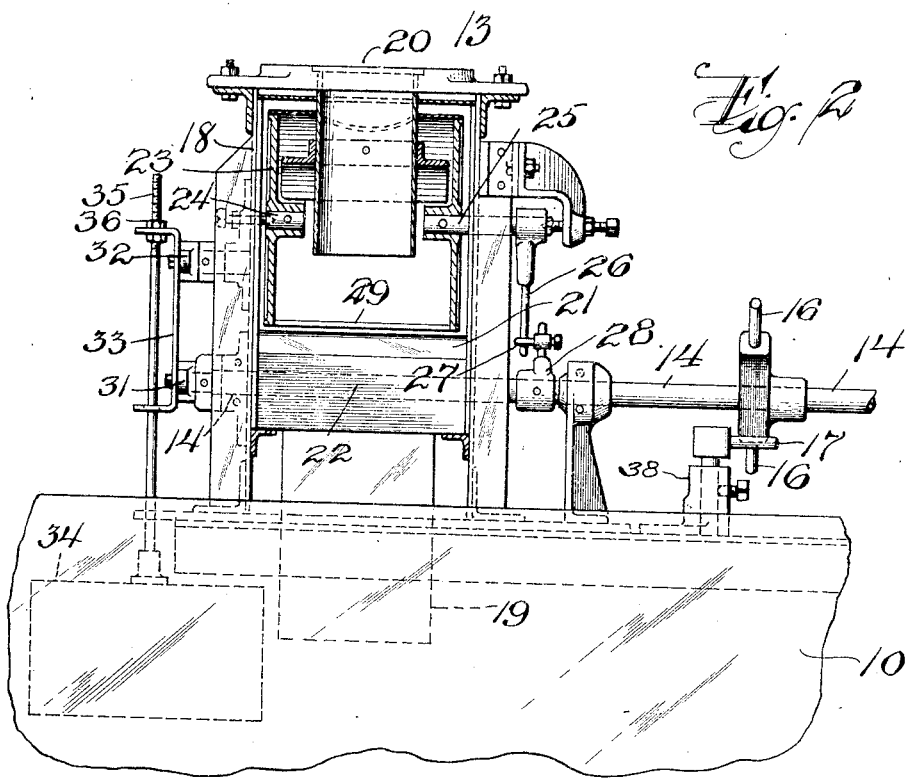
Figure 1:
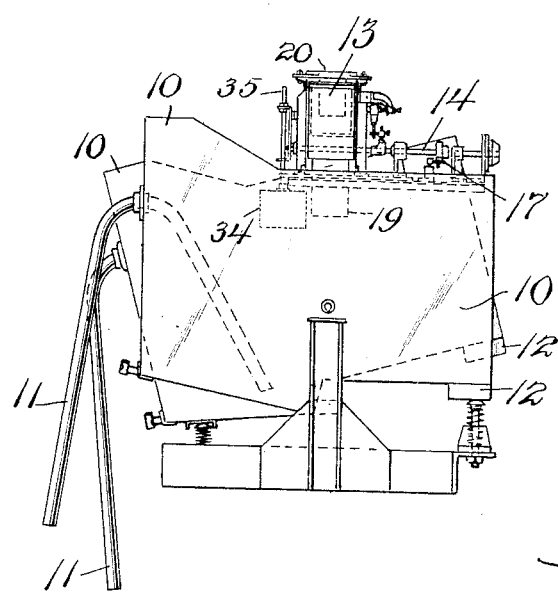

The invention is illustrated in the accompanying drawings in which Figure 1 is a side view of a liquid measuring machine in which the invention is used. Figure 2 is an enlarged section of the flow-directing means. Figure 3 is a front view of the flow-directing means showing a part of the tanks and Figure 4 is a vertical section of the tilting part of the flow-directing means.

The machine comprises tilting tanks 10 which are emptied by the siphon pipe 11 when the tanks are tilted. When a tank tilts it moves the flow-directing means so that liquid is delivered into the other tank and when a tank is partly emptied it returns to its normal level position as it is balanced so that it will rest in a non-tilted position, this balancing being usually regulated by counterweights 12. The flow-directing means is a balanced flow-directing means and remains in position until actuated by suitable floats and the other tank. The flow-directing means which is indicated in general by 13 is actuated by a rod 14 which is rocked by a cross-arm 16, the projecting ends of which are engaged alternately by the sides on the tanks which have plates 37 for this purpose. These features are old and are not illustrated in detail. The pins 17 are mounted on an adjustable support 38 and are engaged by the cross arm 16 to limit the throw of the cross-arm.

The flow-directing means 13 comprises a suitable casing 18 with the two outlets 19, one in each tank and with the inlet 20 supplied from a suitable vat or tank from which the liquid is drawn. In the measurement of the measurement of the liquids, whether they be free flowing as water or the like or heavy such as oils and sirups it is necessary for precision of measurement that the flow of fluid be gradually reduced into a tank until there is but a relatively small quantity flowing and which finally is entirely shut off when the tank tilts so that practically no excess is delivered into the tank beyond its tilting capacity. My form of flow-directing means provides a partition 21 projecting up from the bottom of the casing 18 from which the liquid flows over the plates 22 to the respective outlets 19. Above this is mounted a hollow member 23 which can rock or oscillate. The hollow member is in the form of a cylinder mounted at its ends on a suitable bearing 24 on one end and on the shaft 25 on the other end, the shaft acting to rock the member by suitable mechanism such as the arm 26 which is engaged by the spaced pins 27 on the arm 28 secured to the shaft 14, so that it is rocked first to one side and then the other as the shaft 14 is oscillated and the outlet opening 29 of the hollow member is swung first to one side and then to the other of the partition 21, thus delivering liquid descending through the inlet pipe 30 to first one tank and then the other.

The shaft 14 extends to the front of the casing as will be seen from Figures 2 and 3 and is provided with a float-operated mechanism consisting of parallel levers 31 and 32 which are joined by the links 33 which in turn support the floats 34, one in each tank. These floats can be adjusted by such means as the screw-threaded rod 35 and the nuts 36.

The operation of this device will be evident, the liquid in a tank that is receiving the discharge of liquid through the outlet opening 29 of the flow-directing means operates on its float 34 as it approaches the tilting level and by means of the lever 31 the shaft 14 and the arm 26 gradually swings the hollow member 23 so that it passes slowly over the partition 21 and delivers an increasing amount of liquid in the other tank and a decreasing amount of liquid in the tank in question. When the amount of liquid now being received finally raises the level in the tank to where the tilting takes place the amount is reduced to a small stream in comparison with the full flow and then the tank tilts and the plate 37 engages the cross-arm 16 of the flow-directing means and throws the hollow member 23 completely over.

It will be evident that slight modifications may be made in the construction of the device without departing from the scope of the invention.

I claim:—

1. A liquid-measuring machine comprising tilting tanks arranged side by side, a flow-directing means operated by the tanks and directing the liquid to the tanks alternately, said flow-directing means including an oscillating hollow cylindrical member having an inlet near the top and an outlet at the bottom and a partition under the outlet whereby the liquid falls first to one side and then to the other side of the partition, floats arranged in the tanks, means connecting the floats to the hollow member to shift it gradually along its path of movement until a tank tilts and means for suddenly shifting the hollow member the remainder of its movement upon tilting movement of one of the tanks.

2. A flow-directing means for liquid weighing machine comprising a substantially semi-cylindrical casing including a cylindrical hollow member mounted so that it can rock and having an inlet near the top and an opening in the bottom for the escape of liquid, a partition across which the opening passes to direct liquid to alternate sides and a means for rocking the member.

3. A flow-directing means for liquid weighing machine comprising a cylindrical casing including a cylindrical hollow member mounted so that it can rock and having an inlet near the top and an opening in the bottom for the escape of liquid, a partition across which the opening passes to direct liquid to alternate sides, a pair of floats on opposite sides of the flow-directing means, means connecting the floats to the member for moving it to alternate positions, and means for completing the moving initiated by the floats.

In testimony whereof I affix my signature.

WENZEL W. LEINERT.